(12) United States Patent
Schmidlin (10) Patent No.: US 10,001,293 B2
(45) Date of Patent: Jun. 19, 2018

(54) METHOD FOR CONTROLLING OPERATION OF AN HVAC SYSTEM

(71) Applicant: BELIMO HOLDING AG, Hinwil (CH)

(72) Inventor: Peter Schmidlin, Uster (CH)

(73) Assignee: BELIMO HOLDING AG, Hinwil (CH)

( * ) Notice: Subject to any disclaimer, the term of this patent is extended or adjusted under 35 U.S.C. 154(b) by 752 days.

(21) Appl. No.: 14/537,241

(22) Filed: Nov. 10, 2014

(65) Prior Publication Data

US 2016/0131381 A1 May 12, 2016

(51) Int. Cl.
*G06F 19/00* (2018.01)
*F24F 11/00* (2018.01)
(Continued)

(52) U.S. Cl.
CPC ............ *F24F 11/30* (2018.01); *F24F 3/0442* (2013.01); *F24F 11/006* (2013.01); *F24F 11/0012* (2013.01); *F24F 11/0076* (2013.01); *F24F 11/62* (2018.01); *F24F 11/70* (2018.01); *H04L 12/2818* (2013.01); *H04L 67/10* (2013.01); *H04L 67/101* (2013.01); *H04L 67/12* (2013.01);
(Continued)

(58) Field of Classification Search
CPC ........ F24F 11/0012; F24F 11/30; F24F 11/70; F24F 2110/10; F24F 11/62; F24F 3/0442; F24F 11/64; F24F 2140/50; F24F 2140/40; F24F 2110/40; F24F 11/58; H04L 67/101; H04L 67/12; H04L 12/2818; H04L 67/10

USPC .................................................. 700/276, 277
See application file for complete search history.

(56) References Cited

U.S. PATENT DOCUMENTS 5,705,734 A * 1/1998 Ahmed ................ F24F 11/0001
454/256
6,250,560 B1 * 6/2001 Kline .................... G05D 7/0635
236/49.3
(Continued)

FOREIGN PATENT DOCUMENTS

WO 2014051634 A1 4/2014

OTHER PUBLICATIONS

Johnson Controls, Damper and Actuator Manual 268.1, copyright 1991 Johnson Controls, Inc., Code No. LIT-2681H352.*
(Continued)

*Primary Examiner* — Michael D Masinick
(74) *Attorney, Agent, or Firm* — Sughrue Mion, PLLC (57) ABSTRACT

For controlling the flow of air into the zones (Z1, Z2, Z3, Zi) of a variable air volume HVAC system (1) having actuator driven dampers (D1, D2, D3, Di), which operate in a range from a minimum damper position to a maximum damper position for adjusting the flow of air into a zone (Z1, Z2, Z3, Zi), flow measurement values and current damper positions are transmitted via a telecommunications network (2) to a cloud-based HVAC control center (3). Using the flow measurement values and calibration values, which indicate HVAC system parameters at a defined calibration pressure in the HVAC system (1) and at different damper positions, the cloud-based HVAC control center (3) calculates the minimum damper position for the actuators (A1, A2, A3, Ai), such that the pressure in the HVAC system (1) does not exceed a defined maximum pressure threshold, and transmits the minimum damper position to the actuators.

12 Claims, 4 Drawing Sheets

(51) Int. Cl.
*F24F 3/044* (2006.01)
*H04L 12/28* (2006.01)
*H04L 29/08* (2006.01)

(52) U.S. Cl.
CPC .............. *F24F 11/58* (2018.01); *F24F 11/64* (2018.01); *F24F 2011/0041* (2013.01); *F24F 2011/0046* (2013.01); *F24F 2011/0056* (2013.01); *F24F 2011/0063* (2013.01); *F24F 2011/0071* (2013.01); *F24F 2110/10* (2018.01); *F24F 2110/40* (2018.01); *F24F 2140/40* (2018.01); *F24F 2140/50* (2018.01); *Y02B 30/767* (2013.01)

(56) References Cited

U.S. PATENT DOCUMENTS

| | | | | |
|---|---|---|---|---|
| 6,581,847 | B2 * | 6/2003 | Kline | ............. G05D 7/0635 236/49.3 |
| 7,665,670 | B2 * | 2/2010 | Ahmed | ............. F23N 5/20 236/1 B |
| 8,374,725 | B1 * | 2/2013 | Ols | ............. F24F 11/0012 261/118 |
| 8,483,883 | B1 * | 7/2013 | Watson | ............. F24F 3/044 236/49.3 |
| 2001/0042792 | A1 * | 11/2001 | Kline | ............. G05D 7/0635 236/49.3 |
| 2005/0258260 | A1 * | 11/2005 | Ahmed | ............. F23N 5/20 236/51 |
| 2012/0253524 | A1 * | 10/2012 | Norrell | ............. F24F 13/1426 700/277 |
| 2013/0201316 | A1 | 8/2013 | Binder et al. | |

OTHER PUBLICATIONS

International Search Report and Written Opinion issued by International Searching Authority in corresponding International application No. PCT/EP2015/073573, dated Jan. 20, 2016.

* cited by examiner

METHOD FOR CONTROLLING OPERATION OF AN HVAC SYSTEM

FIELD OF THE INVENTION

The present invention relates to a method and a system for controlling operation of an HVAC (Heating, Ventilation and Air Conditioning) system. Specifically, the present invention relates to a method and a system for controlling operation of an HVAC system having actuator driven valves for adjusting the flow of fluid in the HVAC system and one or more sensors for sensing operational parameters of the HVAC system.

BACKGROUND OF THE INVENTION

In HVAC systems, zoning is becoming increasingly popular in residential buildings as it allows a finer regulation of the temperature and flow of energy. The flow of fluid, e.g. air, i.e. its amount or volume, into a zone, e.g. an enclosed space or room in a building, is controlled by an actuated valve or damper. The position of the valve or damper is controlled depending on the measurement of the thermostat in each zone and demand, e.g. a desired temperature in the zone. The demand is set by a user or by a computerized system that anticipates the user's demand. A new generation of thermostats is capable of learning users' habits to anticipate the needs in different zones. Moreover, the new generation of thermostats can be connected to a telecommunications network and can incorporate and consider in their anticipatory algorithms outside information, such as climatic region, altitude, and/or weather predictions.

Flow of air in a zone may be affected by the closing and opening of other dampers in the HVAC system, making the system often quite instable. To obtain pressure-independence of the air flow in the zone, flow sensors are implemented in the air duct and the damper position is controlled in response to the demand and the actual flow value.

In variable air volume (VAV) HVAC systems with multiple zones, the closing of all dampers leads to possible mechanical damage of the duct work and often to an unacceptable noise level. Furthermore, if all dampers but one are closed, the regulation of the flow becomes increasingly difficult, as the position of the damper has to be controlled within a small range because of the excess system pressure.

To overcome some of these problems, in a first solution of the prior art, a fan with variable speed is used. The speed of the ventilator is adjusted by a local controller depending on the position of the damper with the largest opening. The applicant is selling such a solution under the name "Fan Optimiser".

In a second solution of the prior art, a modulating bypass damper is used to maintain the overall system pressure (after the bypass damper) within reasonable limits. However, often it is not possible to retrofit existing HVAC system installations with the addition of such a bypass damper.

SUMMARY OF THE INVENTION

It is an object of this invention to provide a method and a system for controlling operation of an HVAC system, which method and system do not have at least some of the disadvantages of the prior art. In particular, it is an object of the present invention to provide a method and a system for controlling operation of an HVAC system having actuator driven valves for adjusting the flow of fluid in the HVAC system and one or more sensors for sensing operational parameters of the HVAC system. In an aspect of this invention, provided are a method and a system for controlling the flow of air into a plurality of zones of a variable air volume HVAC system, which method and system do not require a fan with variable speed or the installation of a bypass damper.

According to the present invention, these objects are achieved through the features of the independent claims. In addition, further advantageous embodiments follow from the dependent claims and the description.

An HVAC system has actuator driven valves for adjusting the flow of fluid in the HVAC system and one or more sensors for sensing operational parameters of the HVAC system. In the present context the term "valve" is meant to also include "dampers", vice versa, the term "damper" includes "valves", unless explicitly stated otherwise. Moreover, while the specification refers primarily to "air", one skilled in the art will understand that the described solution is applicable to fluids in general, including other types of gas as well as liquids, e.g. water.

According to the present invention, the above-mentioned objects are particularly achieved in that for controlling operation of the HVAC system sensed operational parameter values of the HVAC system are transmitted from the one or more sensors via a telecommunications network to a cloud-based HVAC control center. In the cloud-based HVAC control center, control values for the actuators are calculated using the sensed operational parameter values from the one or more sensors and calibration values stored in the cloud-based HVAC control center. The calibration values indicate operational parameters of the HVAC system at defined conditions in the HVAC system. The control values for the actuators are transmitted from the cloud-based HVAC control center to the actuators.

In an embodiment, current valve position values are transmitted from the actuators via the telecommunications network to the cloud-based HVAC control center and in the cloud-based HVAC control center the control values for the actuators are calculated using the current valve position values from the actuators, the sensed operational parameter values from the one or more sensors, and calibration values stored in the cloud-based HVAC control center, whereby the calibration values indicate operational parameters of the HVAC system at defined valve positions and defined conditions in the HVAC system.

A variable air volume HVAC system has a plurality of zones, actuator driven dampers, which operate in a range from a minimum damper position to a maximum damper position for adjusting the flow of air into a zone of the HVAC system, and one or more flow sensors.

In a further aspect of the present invention, for controlling the flow of air into the plurality of zones of the variable air volume HVAC system, flow measurement values are transmitted from the one or more flow sensors via the telecommunications network to the cloud-based HVAC control center. The current damper position values are transmitted from the actuators via the telecommunications network to the cloud-based HVAC control center. In the cloud-based HVAC control center, the minimum damper position is calculated for the actuators such that the pressure in the HVAC system does not exceed a defined maximum pressure threshold, using the flow measurement values from the one or more flow sensors and calibration values stored in the cloud-based HVAC control center. The calibration values indicate HVAC system parameters at a defined calibration pressure in the HVAC system and at different damper positions. The minimum damper position is transmitted from the cloud-based HVAC control center to the actuators.

In an embodiment, the total flow in the HVAC system is determined from the flow measurement values of one or more flow sensors, and the minimum damper position is calculated in the cloud-based HVAC control center, using the total flow in the HVAC system.

In another embodiment, calculating the minimum damper position includes calculating in the cloud-based HVAC control center a flow ratio using the total flow in the HVAC system and calibration flow values stored in the cloud-based HVAC control center, the calibration flow values indicating the flow of air through a damper at the defined calibration pressure in the HVAC system and at the current damper position of the respective damper, and calculating the minimum damper position for the actuators using the flow ratio.

In an embodiment, the flow ratio is compared in the cloud-based HVAC control center to a threshold value, the threshold value being dependent on the defined maximum pressure threshold, and the minimum damper position is calculated depending on the comparison of the flow ratio to the threshold value.

In another embodiment, calculating the minimum damper position includes calculating in the cloud-based HVAC control center a pressure ratio using the total flow in the HVAC system and calibration flow values stored in the cloud-based HVAC control center, the calibration flow values indicating the flow of air through a damper at the defined calibration pressure in the HVAC system and at the current damper position of the respective damper, and calculating the minimum damper position for the actuators by comparing in the cloud-based HVAC control center the pressure ratio to a threshold value, the threshold value being dependent on the defined maximum pressure threshold, and calculating the minimum damper position depending on the comparison of the pressure ratio to the threshold value.

In a further embodiment, demand data is transmitted from the HVAC system via the telecommunications network to the cloud-based HVAC control center. The demand data is indicative of air flow requirements of the zones of the HVAC system. Using the current damper position values from the actuators, the damper having the largest current opening is determined in the cloud-based HVAC control center. A defined maximum damper position is set in the cloud-based HVAC control center for the damper having the largest current opening. Using the demand data and the flow measurement values, an adjusted fan speed is calculated in the cloud-based HVAC control center for a fan in the HVAC system, such that a demand is met for the zone associated with the damper having the largest current opening. The adjusted fan speed is transmitted from the cloud-based HVAC control center via the telecommunications network to the fan in the HVAC system.

In an embodiment, an HVAC control report is generated in the cloud-based HVAC control center and the HVAC control report is transmitted from the cloud-based HVAC control center via the telecommunications network to a communication terminal registered in the cloud-based HVAC control center for the HVAC system. For example, the HVAC control report includes control values for the actuators as calculated by the cloud-based HVAC control center.

In addition to the method and the system for controlling the flow of air into a plurality of zones of a variable air volume HVAC system, the present invention also relates to a computer program product comprising a non-transient computer readable medium having stored thereon computer program code for controlling a processor of a computerized cloud center, such that the cloud center implements a cloud-based HVAC center that performs the steps of: storing calibration values for an HVAC system that indicate operational parameters of the HVAC system at defined conditions in the HVAC system; receiving via a telecommunications network sensed operational parameter values from one or more sensors of the HVAC system; calculating control values for actuators that drive valves of the HVAC system for adjusting the flow of fluid in the HVAC system, using the sensed operational parameter values from the one or more sensors and the calibration values for the HVAC system; and transmitting the control values for the actuators via the telecommunications network to the actuators of the HVAC system.

In a further aspect of the present invention, a computer program product comprises a non-transient computer readable medium having stored thereon computer program code for controlling a processor of a computerized cloud center, such that the cloud center implements a cloud-based HVAC center that performs the steps of: storing calibration values for a plurality of actuator driven dampers of a variable air volume HVAC system, which dampers are driven by the actuators in a range from a minimum damper position to a maximum damper position for adjusting the flow of air into a plurality of zones of the HVAC system, the calibration values indicating HVAC system parameters at a defined calibration pressure in the HVAC system and at different damper positions; receiving via a telecommunications network flow measurement values from one or more flow sensors of the HVAC system; receiving via the telecommunications network current damper position values from the actuators of the HVAC system; calculating a minimum damper position for the actuators such that the pressure in the HVAC system does not exceed a defined maximum pressure threshold, using the flow measurement values from the one or more flow sensors and the calibration values for the dampers at their respective current damper position; and transmitting the minimum damper position via the telecommunications network to the actuators of the HVAC system.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
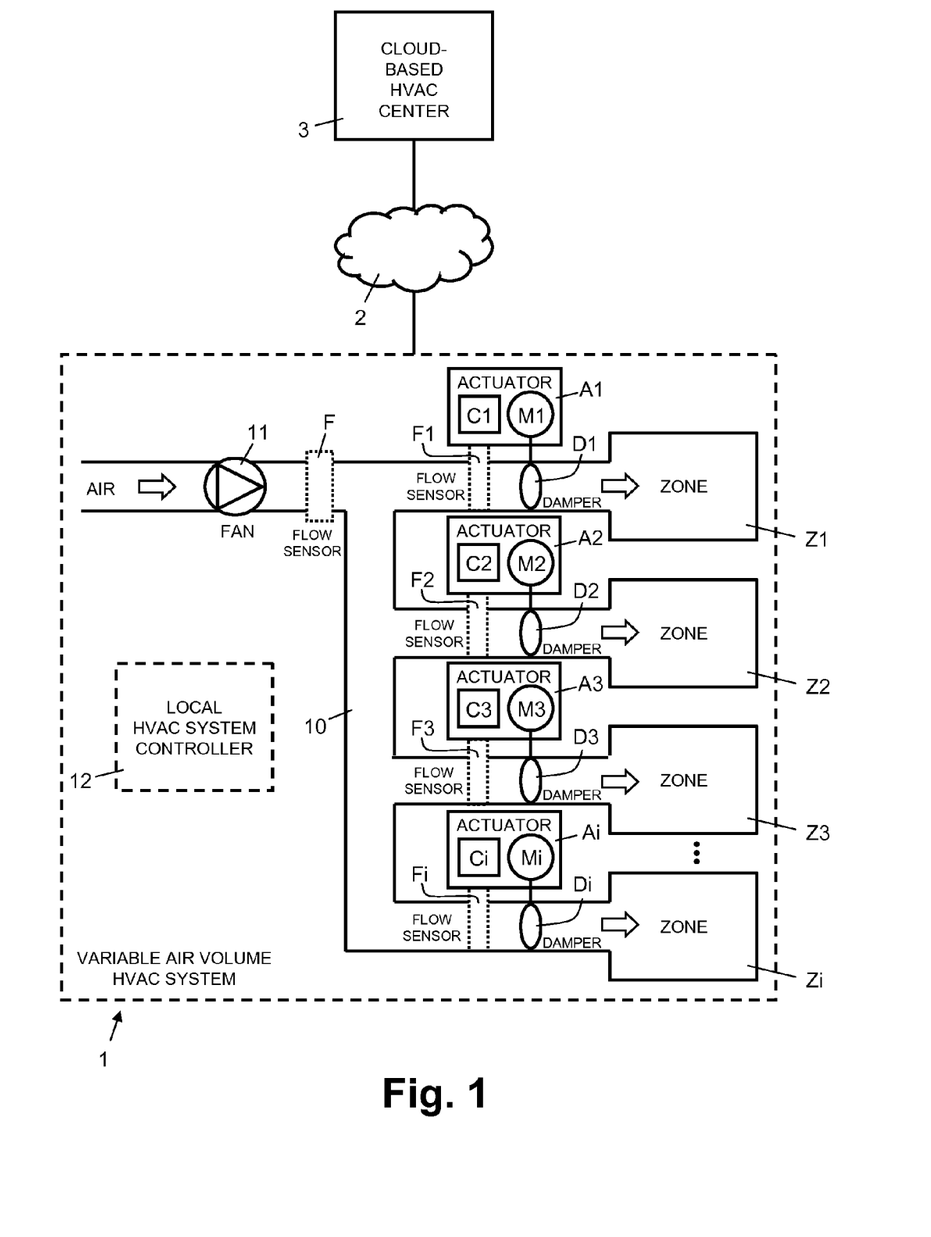
FIG. 1: shows a block diagram illustrating schematically an HVAC system in communication with a cloud-based HVAC center.

In FIG. 1, reference numeral 1 refers to an HVAC system, e.g. a variable air volume (VAV) HVAC system. The HVAC system 1 includes fluid transporting system 10, e.g. an air transporting system 10 with air ducts and pipes for delivering air to a plurality of zones Z1, Z2, Z3, Zi, e.g. enclosed spaces or rooms in a building, for the purpose of heating, ventilating, cooling, and/or air conditioning (HVAC). The air is moved by way of at least one motorized fan 11 arranged in the air transporting system 10. One skilled in the art will understand that in a liquid based HVAC system a pump is used instead of a fan. The flow of air into each of the zones Z1, Z2, Z3, Zi is adjusted and regulated by a respective damper D1, D2, D3, Di arranged in the air transporting system 10. The dampers D1, D2, D3, Di are driven by respective actuators A1, A2, A3, Ai in a range from a minimum damper position $Pos_{min}$ to a maximum damper position $Pos_{max}$. One skilled in the art will understand that in a liquid based HVAC system valves are used instead of dampers. The actuators A1, A2, A3, Ai comprise an electric motor M1, M2, M3, Mi and a controller C1, C2, C3, Ci connected electrically to the respective motor M1, M2, M3, Mi. Each of the controllers C1, C2, C3, Ci comprises an electronic circuit configured to control the respective motor M1, M2, M3, Mi. Depending on the embodiment, the electronic circuits of the controllers C1, C2, C3, Ci are implemented as a programmed processor, including data and program memory, or another programmable logic unit, e.g. an application specific integrated circuit (ASIC). The controllers C1, C2, C3, Ci further comprise a communication module configured for data communication with a local HVAC system controller 12, e.g. via a serial or parallel data communication bus, a wired local area network (LAN), and/or a wireless a local area network (WLAN), and/or with a remote cloud-based HVAC center 3 via a telecommunications network 2. Depending on the embodiment and/or configuration, the telecommunications network 2 includes a LAN, a WLAN, a mobile radio network, e.g. a GSM (Global System for Mobile Communication) or UMTS (Universal Mobile Telephone System) network, and/or the Internet. In an embodiment, the controllers C1, C2, C3, Ci of each of the actuators A1, A2, A3, Ai are connected to a flow sensor F1, F2, F3, Fi configured to measure the flow of air ($\phi_1$, $\phi_2$, $\phi_3$, $\phi_i$, through the respective damper D1, D2, D3, Di into the respective zone Z1, Z2, Z3, Zi. In addition, or as an alternative, the HVAC system 1 comprises a flow sensor F that is connected to the local HVAC system controller 12 and configured to measure the total flow of air $$\phi_{total} = \sum_i \phi_i,$$

the system flow, in the air transporting system 10 to all the zones Z1, Z2, Z3, Zi.

Depending on embodiment and configuration, in addition to the flow sensor F, F1, F2, F3, Fi, the HVAC system 1 comprises further types of sensors and data sources for sensing and generating different types operational parameters of the HVAC system, including system pressure in the transporting system 10, differential pressure of valves and dampers, speed of a fan 11 or a pump, temperature values of the air (or fluid) at different positions in the transporting system 10 and in the zones Z1, Z2, Z3, Zi, damper and valve positions, motor speed of the actuators A1, A2, A3, Ai, etc.

The local HVAC system controller 12 comprises one or more operable computers with one or more processors and one or more communication modules configured for data communication with the actuators A1, A2, A3, Ai or their communication modules or controllers C1, C2, C3, Ci, respectively, and, depending on the embodiment, with the remote cloud-based HVAC center 3 via a telecommunications network 2, as described above in the context of the actuators A1, A2, A3, Ai.

The cloud-based HVAC center 3 comprises one or more operable computers with one or more processors and one or more communication modules configured for data communication with the actuators A1, A2, A3, Ai or their communication modules or controllers C1, C2, C3, Ci, respectively, and/or, depending on the embodiment, with the local HVAC system controller 12 via a telecommunications network 2, as described above in the context of the actuators A1, A2, A3, Ai.

Figure 2:
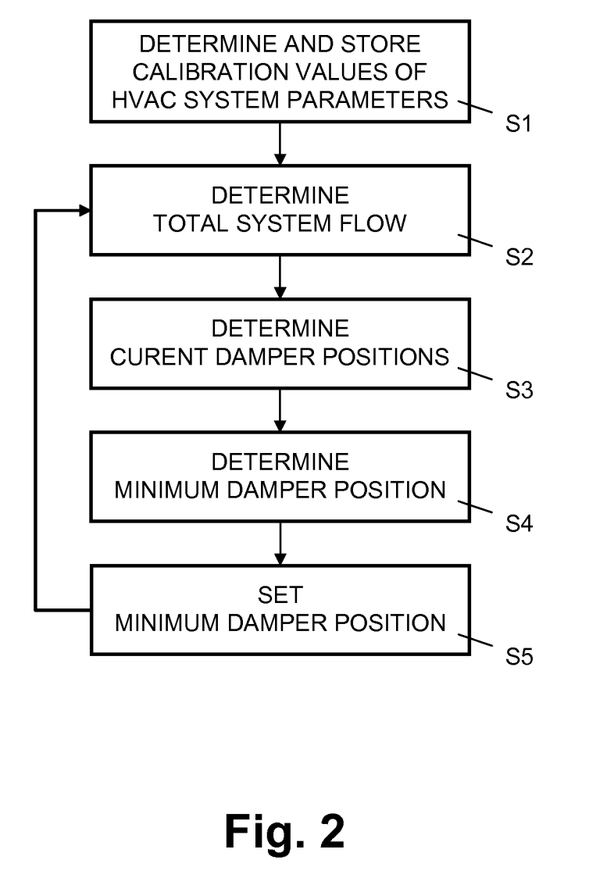
FIG. 2: shows a flow diagram illustrating an exemplary sequence of steps for controlling a variable flow of air into a plurality of zones of an HVAC system.
Figure 3:
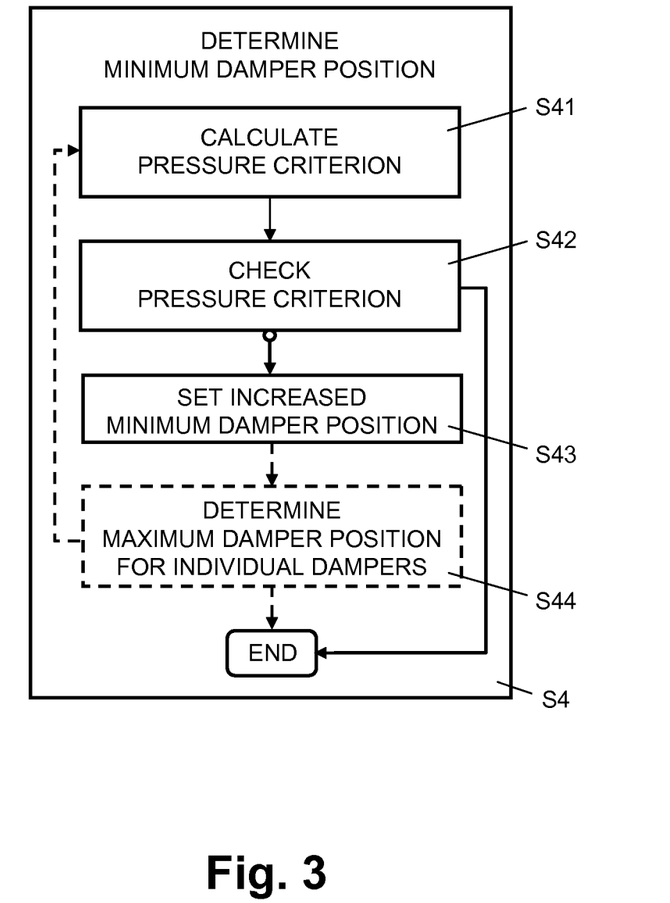
FIG. 3: shows a flow diagram illustrating an exemplary sequence of steps for determining, depending on a flow or pressure ratio of an HVAC system, a minimum damper position for limiting the system pressure.
Figure 4:
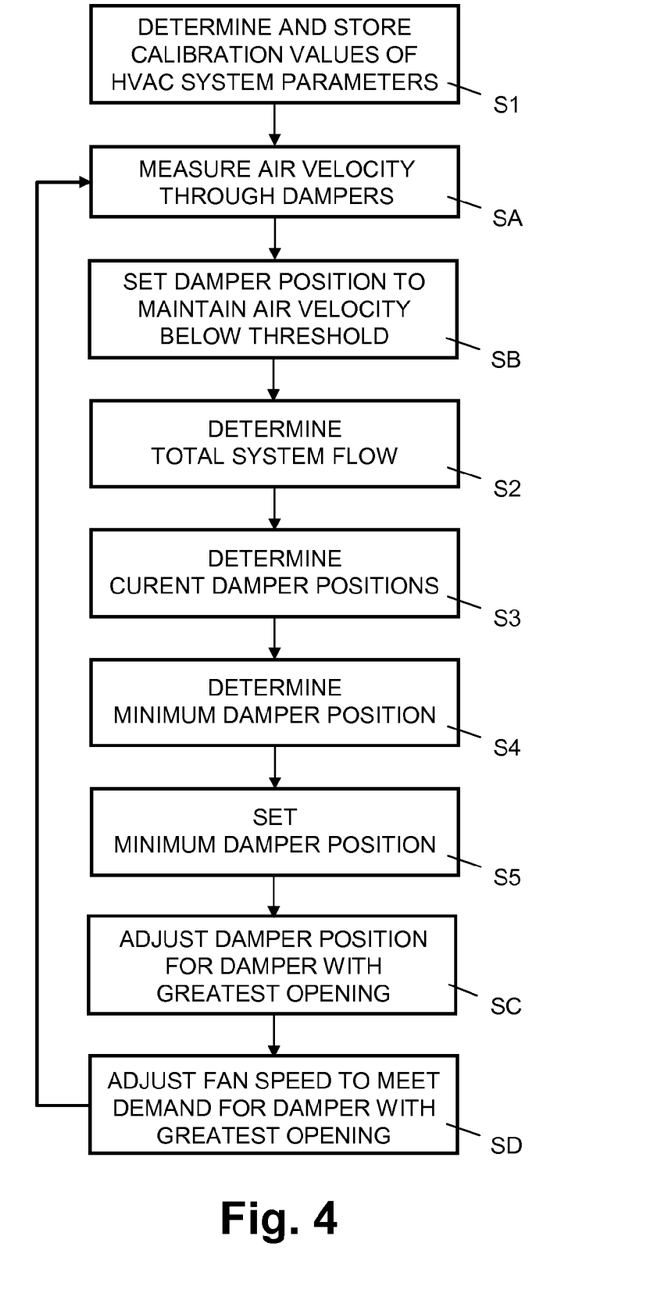
FIG. 4: shows a flow diagram illustrating an exemplary sequence of steps for controlling a variable flow of air into a plurality of zones of an HVAC system having a fan with variable speed.

In the following paragraphs, described with reference to FIGS. 2, 3 and 4 are possible sequences of steps performed by the processors of the cloud-based HVAC center 3, the local HVAC system controller 12, and the controllers C1, C2, C3, Ci for controlling the flow of air $\phi_1$, $\phi_2$, $\phi_3$, $\phi_i$ into the zones Z1, Z2, Z3, Zi of the HVAC system 1.

As illustrated in FIG. 2, in step S1, calibration values of the HVAC system 1 are determined and stored. The calibration values indicate HVAC system parameters at a defined calibration pressure $p_{cal}$ in the HVAC system and at different damper positions $j=\lfloor Pos_0 \ldots Pos_q \ldots Pos_n \rfloor$ of the dampers D1, D2, D3, Di. Specifically, the calibration values of the HVAC system 1 include the flow of air $\phi_{1calj}$, $\phi_{2calj}$, $\phi_{3calj}$, $\phi_{icalj}$ through the dampers D1, D2, D3, Di at the calibration pressure $p_{cal}$ and at different damper positions $j=\lfloor Pos_0 \ldots Pos_q \ldots Pos_n \rfloor$. The calibration values are determined and stored in a calibration phase that is executed periodically or on request, e.g. from the cloud-based HVAC center 3. During the calibration phase the local HVAC system controller 12 operates the air transporting system 10 at a constant calibration pressure $p_{cal}$ and measures and records the flow of air $\phi_{1calj}$, $\phi_{2calj}$, $\phi_{3calj}$, $\phi_{icalj}$ through the dampers D1, D2, D3, Di at the calibration pressure $p_{cal}$ at different damper positions $j=\lfloor Pos_0 \ldots Pos_q \ldots Pos_n \rfloor$. An example of calibration values is illustrated in Table 1 below:

TABLE 1

| | Damper | | | | |
|---|---|---|---|---|---|
| Position j | D1 | D2 | D3 | ... | Di |
| $Pos_0$ | $\phi_{1cal0}$ | $\phi_{2cal0}$ | $\phi_{3cal0}$ | ... | $\phi_{ical0}$ |
| ... | ... | ... | ... | ... | ... |
| $Pos_q$ | $\phi_{1calq}$ | $\phi_{2calq}$ | $\phi_{3calq}$ | ... | $\phi_{icalq}$ |
| ... | ... | ... | ... | ... | ... |
| $Pos_n$ | $\phi_{1caln}$ | $\phi_{2caln}$ | $\phi_{3caln}$ | ... | $\phi_{icaln}$ |

The calibration values $\phi_{1calj}$, $\phi_{2calj}$, $\phi_{3calj}$, $\phi_{icalj}$ are stored in a data store of the local HVAC system controller 12 or the controllers C1, C2, C3, Ci of the actuators A1, A2, A3, Ai. Upon request, the calibration values $\phi_{1calj}$, $\phi_{2calj}$, $\phi_{3calj}$, $\phi_{icalj}$ are transmitted via telecommunications network 2 to the cloud-based HVAC center 3 where they are stored in a data store of the cloud-based HVAC center 3 assigned to the respective HVAC system 1.

In step S2, the total flow of air $\phi_{total}$ in the air transporting system 10, i.e. the current system flow, is determined. Depending on the embodiment or configuration, the current system flow $\phi_{total}$ is determined using the common flow sensor F or by calculating the system flow $$\phi_{total} = \sum_i \phi_i$$

from the flow values $\phi_1$, $\phi_2$, $\phi_3$, $\phi_i$ measured by the individual flow sensors F1, F2, F3, Fi arranged with the actuators A1, A2, A3, Ai or dampers D1, D2, D3, Di, respectively. The calculation of the system flow $$\phi_{total} = \sum_i \phi_i$$

is performed by the processor of the local HVAC system controller 12, by one of the controllers C1, C2, C3, Ci of the actuators A1, A2, A3, Ai, or by the processor of the cloud-based HVAC center 3, based on the flow values $\phi_1$, $\phi_2$, $\phi_3$, $\phi_i$ reported by the controllers C1, C2, C3, Ci of the actuators A1, A2, A3, Ai.

In step S3, the current damper positions $Pos_1$, $Pos_2$, $Pos_3$, $Pos_i$ of the dampers D1, D2, D3, Di are determined. Specifically, the current damper positions $Pos_1$, $Pos_2$, $Pos_3$, $Pos_i$ are transmitted to the cloud-based HVAC center 3. Depending on the embodiment, the current damper positions $Pos_1$, $Pos_2$, $Pos_3$, $Pos_i$ are transmitted to the cloud-based HVAC center 3 together with the respective current flow values $\phi_1$, $\phi_2$, $\phi_3$, $\phi_i$, e.g. in one data transmission $\{Pos_1, \phi_1; Pos_2, \phi_2; Pos_3, \phi_3; Pos_i, \phi_i\}$ or $\{Pos_1, Pos_2, Pos_3, Pos_i, \phi_{total}\}$, respectively, by the local HVAC system controller 12, or in separate data packets $\{Pos_1, \phi_1\}$, $\{Pos_2, \phi_2\}$, $\{Pos_3, \phi_3\}$, $\{Pos_i, \phi_i\}$ from the controllers C1, C2, C3, Ci of the actuators A1, A2, A3, Ai, e.g. including time stamps. Depending on embodiment, configuration, and application, in addition, other types of operational parameters of the HVAC system, as described above, are transmitted to the cloud-based HVAC center 3.

In step S4, the processor of the cloud-based HVAC center 3 determines a minimum damper position $Pos_{min}$ for the dampers D1, D2, D3, Di such that a defined pressure threshold $p_{max}$ is not exceeded in the air transporting system 10 of the HVAC system 1, as will be explained below in more detail with reference to FIG. 3.

In step S5, the minimum damper position $Pos_{min}$ is set for the dampers D1, D2, D3, Di. Specifically, the processor of the cloud-based HVAC center 3 transmits the minimum damper position $Pos_{min}$ via telecommunications network 2 to the HVAC system 1, e.g. to the local HVAC system controller 12 for further distribution or directly to the controllers C1, C2, C3, Ci of the actuators A1, A2, A3, Ai or their communication modules, respectively. The minimum damper position $Pos_{min}$ is stored by the controllers C1, C2, C3, Ci and used for further actuation and operation of the dampers D1, D2, D3, Di. Thus, those dampers D1, D2, D3, Di that, determined by the demand for their respective zone Z1, Z2, Z3, Zi, would have a lower damper position $P_i < Pos_{min}$ will be operated at the newly set minimum damper position $Pos_{min}$.

One skilled in the art will understand that setting an altered value for the minimum damper position $Pos_{min}$ will not only influence the air flow $\phi_1$, $\phi_2$, $\phi_3$, $\phi_i$ through the dampers D1, D2, D3, Di that have an altered damper position, but also on the other dampers D1, D2, D3, Di in the HVAC system 1. Consequently, the steps S2, S3, S4, and S5 are repeated iteratively, until the demands for all zones Z1, Z2, Z3, Zi are met without exceeding the defined maximum pressure $p_{max}$ in the HVAC system 1.

FIG. 3 illustrates an exemplary sequence of (sub-)steps of step S4 for determining the minimum damper position $Pos_{min}$ by the processor of the cloud-based HVAC center 3.

In step S41, the processor of the cloud-based HVAC center 3 calculates a pressure criterion to determine whether (continued) calculation of an altered minimum damper position $Pos_{min}$ is necessary. Depending on the embodiment and configuration, a flow ratio $Q_\phi$, a pressure ratio $Q_p$, or the current (system) pressure $p_{current}$ are used as pressure criterion.

The flow ratio $$Q_\phi = \frac{\sum_i \phi_{ical\,j}}{\phi_{total}}$$

is calculated using the calibration flow values $\phi_{1calj}$, $\phi_{2calj}$, $\phi_{3calj}$, $\phi_{icalj}$ at the current damper positions $j=[Pos_1, Pos_2, Pos_3, Pos_i]$ of the respective damper D1, D2, D3, Di. In an embodiment, in subsequent steps, the flow ratio $$Q_\phi = \frac{\sum_i \phi_{ical\,j}}{\phi_{total}}$$

is calculated using the calibration flow values $\phi_{1calj}$, $\phi_{2calj}$, $\phi_{3calj}$, $\phi_{icalj}$ at adjusted damper positions $j_{adjusted} = [Pos_{1adj}, Pos_{2adj}, Pos_{3adj}, Pos_{iadj}]$ of the respective damper D1, D2, D3, Di, as will be explained below in the context of optional step S44.

The pressure ratio $$Q_p = \sqrt{\frac{p_{cal}}{p_{current}}}$$

is calculated using the calibration pressure $p_{cal}$ and the current pressure $p_{current}$, whereby the current pressure $p_{current}$ is measured by way of a pressure sensor in the HVAC system 1 and transmitted to the cloud-based HVAC center 3, e.g. together with the current damper positions $Pos_1$, $Pos_2$, $Pos_3$, $Pos_i$ and/or flow values $\phi_1$, $\phi_2$, $\phi_3$, $\phi_i$, $\phi_{total}$, as described above. Without the measurement of the current pressure $p_{current}$, the pressure ratio $Q_p$ or the current pressure $p_{current}$, respectively, is calculated from the flow ratio $$Q_\phi = \frac{\sum_i \phi_{ical\,j}}{\phi_{total}},$$

as the flow ratio $Q_\phi$ is equal to the pressure ratio $$Q_p = \sqrt{\frac{p_{cal}}{p_{current}}}$$

$$= \frac{\sum_i \phi_{ical\,j}}{\phi_{total}}.$$

In step S42, the processor of the cloud-based HVAC center 3 checks the pressure criterion of step S41 to determine whether (continued) calculation of an increased minimum damper position $Pos_{min}$ is necessary. If the pressure criterion is met, i.e. the current pressure $p_{current}$ does not exceed the defined pressure threshold $p_{max}$, step S4 ends and processing continues in step S5, as described above. Otherwise, processing continues in step S43 by setting an increased minimum damper position $Pos_{min}$ for lowering the current system pressure $p_{current}$.

For checking the pressure criterion, the processor of the cloud-based HVAC center 3 compares the pressure criterion to a respective threshold value. Specifically, the processor of the cloud-based HVAC center 3 checks whether the flow ratio $Q_\phi$ exceeds a defined flow ratio threshold $Q_{\phi\ min}$, whether the pressure ratio $Q_p$ exceeds a defined pressure ratio threshold $Q_{p\ min}$, or whether the current pressure $p_{current}$ exceeds the defined pressure threshold $p_{max}$, respectively. To ensure that the maximum pressure $p_{max}$ is not exceeded, the flow ratio threshold $Q_{\phi\ min}$ or the pressure ratio threshold $Q_{p\ min}$, respectively, is defined based on the defined maximum pressure $p_{max}$. Specifically, the flow ratio threshold $Q_{\phi\ min}$ or the pressure ratio threshold $Q_{p\ min}$, respectively, is defined as a minimum threshold value $$Q_{\phi min} = Q_{pmin} = \sqrt{\frac{p_{cal}}{p_{max}}}$$

from the ratio of the calibration pressure $p_{cal}$ and the defined maximum pressure $p_{max}$. Thus, in step S42 the processor of the cloud-based HVAC center 3 checks whether $$Q_\phi = \frac{\sum_i \phi_{ical_j}}{\phi_{total}} > \sqrt{\frac{p_{cal}}{p_{max}}} \text{ or }$$

$$Q_p = \sqrt{\frac{p_{cal}}{p_{current}}} > \sqrt{\frac{p_{cal}}{p_{max}}},$$

or $p_{current} \leq p_{max}$, respectively. Based on user experience, a damper is considered noisy at fluid speed through the damper of $$v > 2.5 \frac{m}{s};$$

thus, the maximum pressure $p_{max}$ is set to a value where the fluid speed through the dampers is limited to $$v_{max} = 2.5 \frac{m}{s}.$$

Depending on the embodiment and/or application, the maximum pressure $p_{max}$ is determined in a calibration phase through system measurements at a maximum fluid speed through the dampers of $$v_{max} = 2.5 \frac{m}{s}.$$

Alternatively, the maximum pressure $p_{max}$ is determined based on Bernoulli's equations for fluid dynamics, $$p_{max} \approx \rho \left( C - \frac{v_{max}^2}{2} \right)$$

where $\rho$ is the density of the fluid, and C is a constant that depends on the actual installation. The values of measurement-based maximum pressure $p_{max}$, constant C, and/or fluid density $\rho$ are determined and provided by the processor of the cloud-based HVAC center 3, e.g. from a database arranged in or connected to the cloud-based HVAC center 3 and assigned to the respective HVAC system 1.

Furthermore, the processor of the cloud-based HVAC center 3 transmits to the HVAC system 1, e.g. to the local HVAC system controller 12 or the actuators A1, A2, A3, Ai or their controllers C1, C2, C3, Ci or communication modules, respective altitude values $\underline{h}$ for the flow sensors F1, F2, F3, Fi, F (i.e. their specific altitudes $\underline{h}$ of their location, as stored in the database arranged in or connected to the cloud-based HVAC center 3) for adjusting the measurement of air flow by the sensors F1, F2, F3, Fi, F. With regards to using the value of altitude h for adjusting the measurement of the (air) flow sensors F1, F2, F3, Fi, F, it shall be explained here that flow sensors F1, F2, F3, Fi, F that rely on measuring a differential pressure $\Delta p$ for determining the flow $\phi = c \cdot \sqrt{\Delta p}$, where c is a constant value, e.g. c=10, are dependent on air density and, thus, altitude h. The air density $p_h$ [kg/m$^3$] or air pressure $p_h$[hPa], respectively, at a particular altitude h is defined by the international barometric formula $$p_h = 1.2255 \text{ kg/m}^3 \cdot \left(1 - \frac{6.5 \cdot h}{288 \text{ km}}\right)^{4.255} \text{ or}$$

$$p_h = 1013 \text{ } h\text{Pa} \cdot \left(1 - \frac{6.5 \cdot h}{288 \text{ km}}\right)^{5.255},$$

respectively. The measurement error for the differential pressure $\Delta p$ from a sensor calibrated for sea level (h=0 m) is approximately 1% for every 100 m altitude. For example, at 500 m above sea level, the measured differential pressure $\Delta p_{measured}$ has an error of approximately 5%, i.e. $\Delta p_{measured} = 0.95 \cdot \Delta p_{real}$. Consequently, the error for the flow $\phi = c \cdot \sqrt{0.95 \cdot \Delta p} = c \cdot 0.975 \cdot \sqrt{\Delta p}$ is approximately 2.5%. The altitude value h is used to adjust/correct the measurement of the differential pressure $\Delta p_{adjusted} = \Delta p_{measured} \cdot 8809/(8809-h)$ and, thus, the flow $\phi_{adjusted} = c \cdot \sqrt{\Delta p_{measured} \cdot 8809/(8809-h)}$ measured by the respective flow sensors F1, F2, F3, Fi, F.

If the pressure criterion is not met, i.e. if the flow ratio $Q_\phi$ does not exceed the defined flow ratio threshold $Q_\phi > Q_{\phi\ min}$ or the pressure ratio $Q_p$ does not exceed the defined pressure ratio threshold $Q_p > Q_{p\ min}$ or the current pressure $p_{current}$ exceeds the defined pressure threshold $p_{current} > p_{max}$, respectively, the processor of the cloud-based HVAC center 3 continues calculating an (increased) minimum damper position $Pos_{min}$; otherwise, the processor of the cloud-based HVAC center 3 proceeds in step S5 by setting the minimum damper position $Pos_{min}$ for the HVAC system 1, as described above.

In step S43, the processor of the cloud-based HVAC center 3 sets an increased minimum damper position $Pos_{min}$. The increased minimum damper position $Pos_{min} = Pos_{min\_previous} + Pos_{increment}$ is set by adding an incremental value $Pos_{increment}$, e.g. $Pos_{increment} = 1°$ or $Pos_{increment} = 2\%$, to the previous value of the minimum damper position $Pos_{min\_previous}$.

Subsequently, the processor of the cloud-based HVAC center 3 continues in step S5 by setting the minimum damper position $Pos_{min}$ for the dampers D1, D2, D3, Di and repeating iteratively steps S2, S3, S4, and S5, until the demands for all zones Z1, Z2, Z3, are met without exceeding the defined maximum pressure $p_{max}$ in the HVAC system 1, as described above.

As indicated schematically in FIG. 3 by the dashed lines, in an embodiment with optional step S44, before setting the minimum damper position in step S5, the processor of the cloud-based HVAC center 3 determines for each of the dampers D1, D2, D3, Di in the HVAC system 1 an adjusted damper position $j_{adjusted}=[Pos_{1adj}, Pos_{2adj}, Pos_{3adj}, Pos_{iadj}]$ by selecting the maximum value $\max\{Pos_{min}, j\}$ from the minimum damper position $Pos_{min}$, determined in step S43, and the current damper position $j=[Pos_1, Pos_2, Pos_3, Pos_i]$ that corresponds to a target or demand value set for the respective damper D1, D2, D3, Di. Subsequently, the processor of the cloud-based HVAC center 3 proceeds in step S41 by recalculating the flow ratio or pressure ratio $$Q_\phi = \frac{\sum_i \phi_{icalj}}{\phi_{total}} = Q_P$$

using the calibration flow values $\phi_{1calj}$, $\phi_{2calj}$, $\phi_{3calj}$, $\phi_{icalj}$ at the adjusted damper positions $j_{adjusted}=[Pos_{1adj}, Pos_{2adj}, Pos_{3adj}, Pos_{iadj}]$ of the respective damper D1, D2, D3, Di and continues further (calculatory) iterations, until the pressure criterion is met in step S42.

FIG. 4, relates to an embodiment where the fan 11 is used with variable fan speed. In FIG. 4, steps that correspond to those illustrated in FIG. 2 or 3 are indicated with the same reference numerals.

In step S1, calibration values of the HVAC system 1 are determined and stored, as described above.

In step SA, the controllers C1, C2, C3, Ci of the actuators A1, A2, A3, Ai determine the air velocity through the respective dampers, D1, D2, D3, Di using a velocity sensor, e.g. a velocimeter combined with or based on the flow sensor F1, F2, F3, Fi.

In step SB, the controllers C1, C2, C3, Ci control the respective motor M1, M2, M3, Mi of the actuator A1, A2, A3, Ai to adjust the position of the respective damper D1, D2, D3, Di such that the air velocity $v_i$ through the respective damper D1, D2, D3, Di does not exceed a defined maximum air velocity threshold $v_i \leq v_{max}$. Based on user experience, a damper D1, D2, D3, Di is considered noisy at an air velocity exceeding $$v_{max} = 2.5 \frac{m}{s}.$$

In steps S2, S3, S4, and S5, the processor of the cloud-based HVAC center 3 sets iteratively a minimum damper position $Pos_{min}$ for the HVAC system 1, as described above.

In step SC, the processor of the cloud-based HVAC center 3 or the local HVAC system controller 12 adjusts the damper position of the damper D1, D2, D3, Di with the greatest current damper position $Pos_1$, $Pos_2$, $Pos_3$, $Pos_i$, i.e. with the largest corresponding opening or orifice, to a defined maximum position $Pos_{max}$, e.g. for an opening of 80%, $Pos_{max}=80\%$.

In step SD, the processor of the cloud-based HVAC center 3 or the local HVAC system controller 12 adjusts the fan speed of the fan 11 to meet the demand of the zone Z1, Z2, Z3, Zi regulated by the damper D1, D2, D3, Di with the opening set to the defined maximum position $Pos_{max}$ in step SC. In other words, the fan speed is adjusted such that the air flow $\phi_1$, $\phi_2$, $\phi_3$, $\phi_i$ required by the demand for the respective zone Z1, Z2, Z3, Zi is met at the set maximum position $Pos_{max}$ of the damper D1, D2, D3, Di for that zone Z1, Z2, Z3, Zi. As illustrated in FIG. 4, processing continues in step SA. In the embodiment where the adjusted fan speed is calculated by the processor of the cloud-based HVAC center 3, demand data is transmitted to the cloud-based HVAC center 3, e.g. together with the current damper positions $Pos_1$, $Pos_2$, $Pos_3$, $Pos_i$ and/or flow values $\phi_1$, $\phi_2$, $\phi_3$, $\phi_i$, $\phi_{total}$, as described above. The demand data, includes temperature values and/or corresponding air flow target values set for the respective zones Z1, Z2, Z3, Zi or the dampers D1, D2, D3, Di, for example. The demand data is transmitted to the cloud-based HVAC center 3 by thermostats arranged in the zones Z1, Z2, Z3, Zi, by the actuators A1, A2, A3, Ai or their controllers C1, C2, C3, Ci or communication modules, or by the local HVAC system controller 12.

In a further embodiment, the processor of the cloud-based HVAC center 3 is configured to generate and transmit to an operator or user of the HVAC system 1 various HVAC control reports. For example, the HVAC control reports are transmitted to one or more communication terminals registered with the cloud-based HVAC center 3 for the respective HVAC system 1, e.g. to mobile communication devices such as mobile radio (cellular) telephones, tablets, or other mobile or fixed computerized communication devices, using e-mail, SMS (Short Messaging Services), or other messaging services and formats. The HVAC control reports include calibration reports, confirmation reports, and/or warning or error reports. The calibration reports include information about the determined and stored calibration values of HVAC system parameters and the associated calibration pressure $p_{cal}$. The confirmation reports include determined totals system flow $\phi_{total}$ and flow values $\phi_1$, $\phi_2$, $\phi_3$, $\phi_i$, current damper positions $Pos_1$, $Pos_2$, $Pos_3$, $Pos_i$, current system pressure $p_{current}$, defined maximum pressure $p_{max}$, and/or determined and set minimum damper position $Pos_{min}$. The warning or error reports include information about malfunctioning dampers D1, D2, D3, Di, failed system calibration, failed system settings, etc.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

The invention claimed is:

1. A method of controlling a flow of air into a plurality of zones of a variable air volume HVAC system having actuator driven dampers, which operate in a range from a minimum damper position to a maximum damper position for adjusting the flow of air into a zone of the HVAC system, and one or more flow sensors, the method comprising:
transmitting flow measurement values from the one or more flow sensors via a telecommunications network to a cloud-based HVAC control center;

transmitting current damper position values from the actuators via the telecommunications network to the cloud-based HVAC control center;

transmitting demand data from the HVAC system via the telecommunications network to the cloud-based HVAC control center, the demand data being indicative of air flow requirements of the zones of the HVAC system;

determining in the cloud-based HVAC control center the damper having a largest current opening, using the current damper position values from the actuators;

setting in the cloud-based HVAC control center a defined maximum damper position for the damper having the largest current opening;

calculating in the cloud-based HVAC control center an adjusted fan speed for a fan in the HVAC system, such that a demand is met for the zone associated with the damper having the largest current opening, using the demand data and the flow measurement values;

transmitting the adjusted fan speed from the cloud-based HVAC control center via the telecommunications network to the fan in the HVAC system;

calculating in the cloud-based HVAC control center the minimum damper position for the actuators such that the pressure in the HVAC system does not exceed a defined maximum pressure threshold, using the current damper position values from the actuators, the flow measurement values from the one or more flow sensors, and calibration values stored in the cloud-based HVAC control center, the calibration values indicating operational parameters of the HVAC system at a defined calibration pressure in the HVAC system and at different damper positions;

determining in the cloud-based HVAC control center, before setting the minimum damper position, for each of the dampers in the HVAC system an adjusted damper position by selecting the maximum value from the minimum damper position and the current damper position set for the respective damper; and transmitting the minimum damper position from the cloud-based HVAC control center to the actuators.

2. The method of claim 1, wherein the total flow in the HVAC system is determined from the flow measurement values of one or more flow sensors, and the minimum damper position is calculated in the cloud-based HVAC control center, using the total flow in the HVAC system.

3. The method of claim 2, wherein calculating the minimum damper position includes calculating in the cloud-based HVAC control center a flow ratio using a total flow in the HVAC system and calibration flow values stored in the cloud-based HVAC control center, the calibration flow values indicating the flow of air through a damper at the defined calibration pressure in the HVAC system and at the current damper position of the respective damper, and calculating the minimum damper position for the actuators using the flow ratio.

4. The method of claim 3, further comprising comparing in the cloud-based HVAC control center the flow ratio to a threshold value, the threshold value being dependent on the defined maximum pressure threshold, and calculating the minimum damper position depending on the comparing of the flow ratio to the threshold value.

5. The method of claim 2, wherein calculating the minimum damper position includes calculating in the cloud-based HVAC control center a pressure ratio using the total flow in the HVAC system and calibration flow values stored in the cloud-based HVAC control center, the calibration flow values indicating the flow of air through a damper at the defined calibration pressure in the HVAC system and at the current damper position of the respective damper, and calculating the minimum damper position for the actuators by comparing in the cloud-based HVAC control center the pressure ratio to a threshold value, the threshold value being dependent on the defined maximum pressure threshold, and calculating the minimum damper position depending on the comparing of the pressure ratio to the threshold value.

6. The method of claim 1, wherein the method further comprises generating in the cloud-based HVAC control center an HVAC control report, and transmitting the HVAC control report from the cloud-based HVAC control center via the telecommunications network to a communication terminal registered in the cloud-based HVAC control center for the HVAC system, the HVAC control report including control values for the actuators.

7. A system configured to control a flow of air into a plurality of zones of a variable air volume HVAC system having actuator driven dampers, which operate in a range from a minimum damper position to a maximum damper position for adjusting the flow of air into a zone of the HVAC system and one or more flow sensors, wherein the system comprises a cloud-based HVAC center including a computer with a processor, wherein the processor is configured to perform the steps of:

storing calibration values for the plurality of actuator driven dampers of the variable air volume HVAC system that indicate operational parameters of the HVAC system at a defined calibration pressure in the HVAC system and at different damper positions;

receiving via a telecommunications network flow measurement values from the one or more flow sensors of the HVAC system;

receiving via the telecommunications network current damper position values from the actuators of the HVAC system;

receiving via the telecommunications network demand data indicative of air flow requirements of the zones;

determining the damper having the largest current opening, using the current damper position values from the actuators;

setting a defined maximum damper position for the damper having the largest current opening;

calculating an adjusted fan speed for a fan in the HVAC system, such that a demand is met for the zone associated with the damper having the largest current opening, using the demand data and the flow measurement values;

transmitting the adjusted fan speed via the telecommunications network to the fan of the HVAC system;

calculating a minimum damper position for the actuators such that the pressure in the HVAC system does not exceed a defined maximum pressure threshold, using the flow measurement values from the one or more flow sensors and the calibration values for the dampers at their respective current damper position;

determining, before setting the minimum damper position, for each of the dampers in the HVAC system an adjusted damper position by selecting the maximum value from the minimum damper position and the current damper position set for the respective damper; and transmitting the minimum damper position via the telecommunications network to the actuators of the HVAC system.

8. The system claim 7, wherein the processor is further configured to determine the total flow in the HVAC system from the flow measurement values of one or more flow sensors, and to calculate the minimum damper position using the total flow in the HVAC system.

9. The system of claim 8, wherein the processor is further configured to store calibration flow values which indicate for the dampers of the HVAC system the flow of air through a damper at the defined calibration pressure in the HVAC system and at different damper positions, to calculate a flow ratio using the total flow in the HVAC system and the calibration flow values for the current damper positions of the respective dampers, and to calculate the minimum damper position using the flow ratio.

10. The system of claim 9, wherein the processor is further configured to compare the flow ratio to a threshold value, the threshold value being dependent on the defined maximum pressure threshold, and to calculate the minimum damper position depending on the comparison of the flow ratio to the threshold value.

11. The system of claim 8, wherein the processor is further configured to store calibration flow values which indicate for the dampers of the HVAC system the flow of air through a damper at the defined calibration pressure in the HVAC system and at different damper positions, to calculate a pressure ratio using the total flow in the HVAC system and the calibration flow values for the current damper positions of the respective dampers, and to calculate the minimum damper position by comparing the pressure ratio to a threshold value, the threshold value being dependent on the defined maximum pressure threshold, and calculating the minimum damper position depending on the comparison of the pressure ratio to the threshold value.

12. A computer program product comprising a non-transient computer readable medium having stored thereon computer program code for controlling a processor of a computerized cloud center, such that the cloud center implements a cloud-based HVAC center that performs the steps of:
  storing calibration values for a plurality of actuator driven dampers of a variable air volume HVAC system, which dampers are driven by the actuators in a range from a minimum damper position to a maximum damper position for adjusting the flow of air into a plurality of zones of the HVAC system, the calibration values indicating operational parameters of the HVAC system at a defined calibration pressure in the HVAC system and at different damper positions;
  receiving via a telecommunications network flow measurement values from one or more flow sensors of the HVAC system;
  receiving via the telecommunications network current damper position values from the actuators of the HVAC system;
  receiving via the telecommunications network demand data indicative of air flow requirements of the zones;
  determining the damper having the largest current opening, using the current damper position values from the actuators;
  setting a defined maximum damper position for the damper having the largest current opening;
  calculating an adjusted fan speed for a fan in the HVAC system, such that a demand is met for the zone associated with the damper having the largest current opening, using the demand data and the flow measurement values;
  transmitting the adjusted fan speed via the telecommunications network to the fan of the HVAC system;
  calculating a minimum damper position for the actuators such that the pressure in the HVAC system does not exceed a defined maximum pressure threshold, using the flow measurement values from the one or more flow sensors and the calibration values for the dampers at their respective current damper position;
  determining, before setting the minimum damper position, for each of the dampers in the HVAC system an adjusted damper position by selecting the maximum value from the minimum damper position and the current damper position set for the respective damper; and
  transmitting the minimum damper position via the telecommunications network to the actuators of the HVAC system.

* * * * *